(No Model.)

P. RUSCO.
KETTLE ATTACHMENT.

No. 516,991. Patented Mar. 20, 1894.

WITNESSES:
Charles Marvin.
M. M. Borst

INVENTOR
Philip Rusco.
BY
Smith & Denison
ATTORNEYS

UNITED STATES PATENT OFFICE.

PHILIP RUSCO, OF ELMIRA, NEW YORK, ASSIGNOR OF ONE-HALF TO WILLIAM H. WYCKOFF, OF SAME PLACE.

KETTLE ATTACHMENT.

SPECIFICATION forming part of Letters Patent No. 516,991, dated March 20, 1894.

Application filed November 20, 1893. Serial No. 491,395. (No model.)

*To all whom it may concern:*

Be it known that I, PHILIP RUSCO, of Elmira, in the county of Chemung, in the State of New York, have invented new and useful Improvements in Kettle Attachments, of which the following, taken in connection with the accompanying drawings, is a full, clear, and exact description.

This invention relates to attachments for detachably securing covers to kettles.

My object is to produce an attachment which may be easily and conveniently secured to any size kettle, whereby the cover may be adapted to be detachably secured to said kettle.

My further object is to provide such attachment for adapting it for use upon a kettle of any size, cheap and durable in its construction, and of great utility; and to that end my invention consists in the several new and novel features and combination of parts hereinafter described and which are specifically set forth in the claim hereunto annexed. It is constructed as follows, reference being had to the accompanying drawings, in which—

Figure 1:
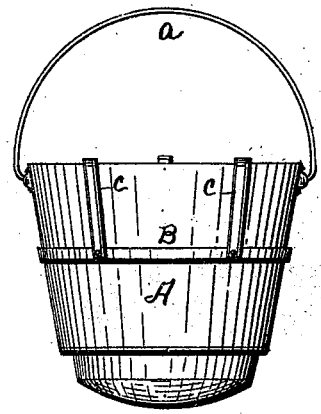
Figure 2:
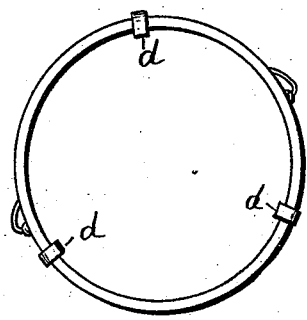
Figure 3:
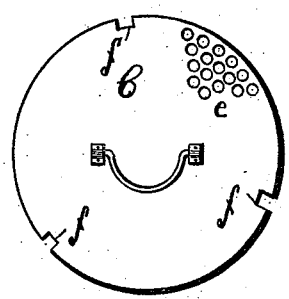
Figure 4:
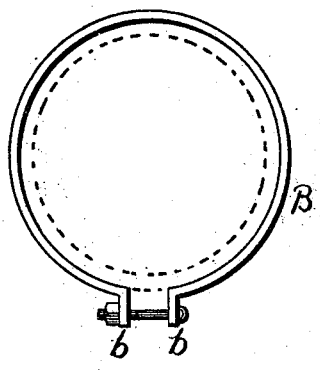
Figure 5:
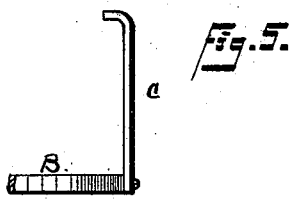

Figure 1, shows a side view of a kettle complete, provided with my attachment. Fig. 2, is a top plan view thereof with the cover removed. Fig. 3, is a top plan view of the cover, detached. Fig. 4, is a top view of the adjustable band which supports the removable arms, forming the lugs which hold the cover. Fig. 5, is a view of one of the removable arms.

Similar letters of reference indicate corresponding parts.

A— is a kettle constructed in the ordinary form, provided with a bail —a—.

B— is a band adapted to surround the kettle and provided with up-turned ends —b— having means for securing said ends adjustably together so as to vary the circumference of said band, to adapt it to a large or small kettle, as may be desired.

—c— are upwardly extending arms secured to the band —B— and having their ends extend over the upper edge of the kettle as shown at —d—, for the purposes hereinafter specified.

C— is a cover constructed of sheet metal or any other material desired, and may be perforated on one side, as shown at —e—, and provided with notches —f— in its periphery, said notches being the same distance apart as the arms —c— upon the band —B— so that when the cover is placed upon the top of a kettle the notches —f— will allow the cover to drop down on to the edge of the kettle, then by giving it a lateral turn the cover will be securely held to the kettle.

It will be observed that this attachment may be readily detached from one vessel and used upon another of either greater or less size.

Having described my invention, what I claim is—

The combination with a kettle of an adjustable band having upwardly and inwardly extending arms, a cover provided with notches, said notches adapted to engage with the inwardly extending ends of said arms, as set forth.

In witness whereof I have hereunto set my hand this 13th day of November, 1893.

PHILIP RUSCO.

In presence of—
  JOHN HUNGERFORD,
  CHARLES C. SPAULDING.